United States Patent [19]
Revelli et al.

[11] Patent Number: 6,089,393
[45] Date of Patent: Jul. 18, 2000

[54] MODULAR STRUCTURE FOR CONSTITUTING AN ENCLOSURE

[75] Inventors: Maurice Revelli, Pierre Benite; Rene Sauzeat, Bourg Les Valence, both of France

[73] Assignee: Pavailler Equipment, France

[21] Appl. No.: 08/827,354

[22] Filed: Mar. 26, 1997

[30] Foreign Application Priority Data

Mar. 26, 1996 [FR] France .................................. 96 04025

[51] Int. Cl.$^7$ .................................................. B65D 27/00
[52] U.S. Cl. ................... 220/4.31; 312/265.5; 312/265.6
[58] Field of Search .................... 220/4.31, 4.02, 220/4.28, 4.33; 312/265.5, 265.6

[56] References Cited

U.S. PATENT DOCUMENTS

| | | | |
|---|---|---|---|
| 1,975,613 | 10/1934 | Nystrom et al. | |
| 3,182,847 | 5/1965 | Fuller | 220/4.31 |
| 4,221,302 | 9/1980 | Kupersmit | 220/4.31 |
| 4,809,851 | 3/1989 | Oestreich, Jr. et al. | 220/4.31 |
| 4,828,132 | 5/1989 | Francis, Jr. et al. | 220/4.31 |
| 5,236,099 | 8/1993 | Fligs et al. | 220/4.31 |
| 5,803,295 | 9/1998 | Tussey | 220/4.31 |

FOREIGN PATENT DOCUMENTS

| | | |
|---|---|---|
| 0043791 | 1/1982 | European Pat. Off. |
| 2 577 030 | 8/1986 | France . |
| 91 06 422 U | 8/1991 | Germany . |
| 2125677 | 9/1972 | Italy . |

*Primary Examiner*—Joseph M. Moy
*Attorney, Agent, or Firm*—Bacon & Thomas PLLC

[57] ABSTRACT

The present invention relates to the construction of an enclosure, the cell defined thereby comprising:

- a floor which comprises on its peripheral edge an upwardly open border for interlocking,
- a ceiling which comprises a peripheral vertical flange,
- pillars which are disposed between the floor and the ceiling to constitute therewith a framework defining support frames determining by their succession the periphery of the framework,
- panels which are fitted in the border of the floor and are each removably fixed on the corresponding support frame,
- and O-rings which are interposed between said constructive elements.

The invention is more particularly applicable to baking ovens.

16 Claims, 4 Drawing Sheets

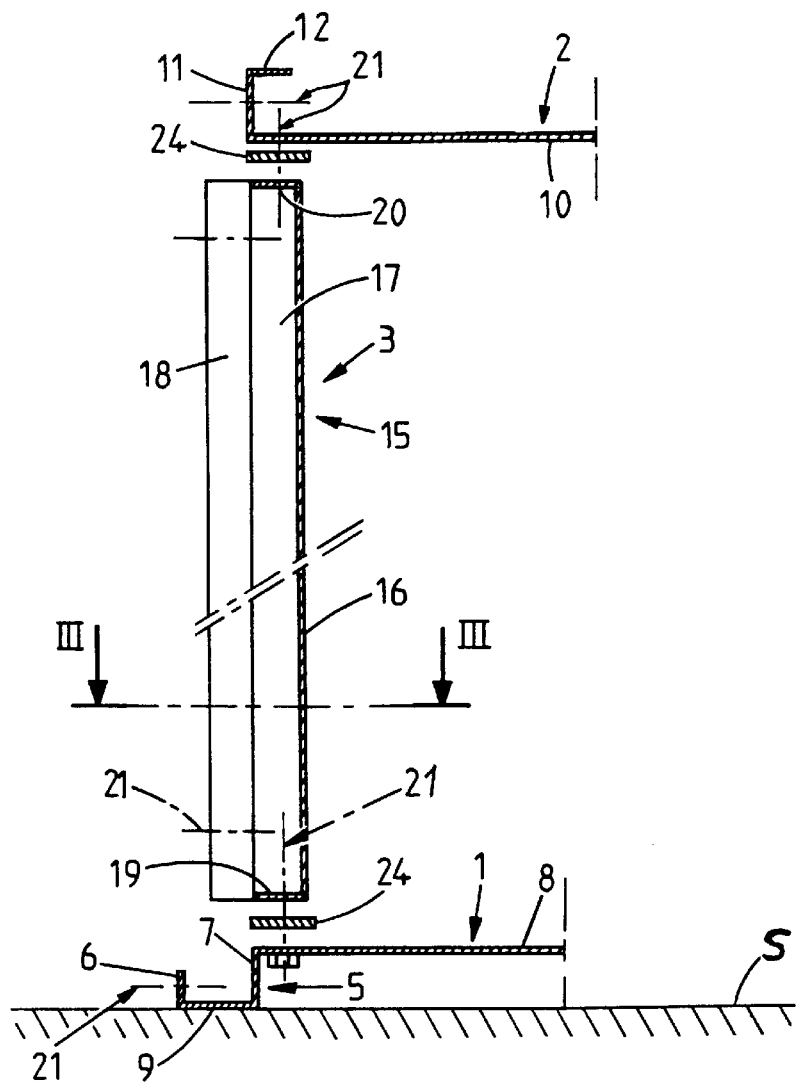
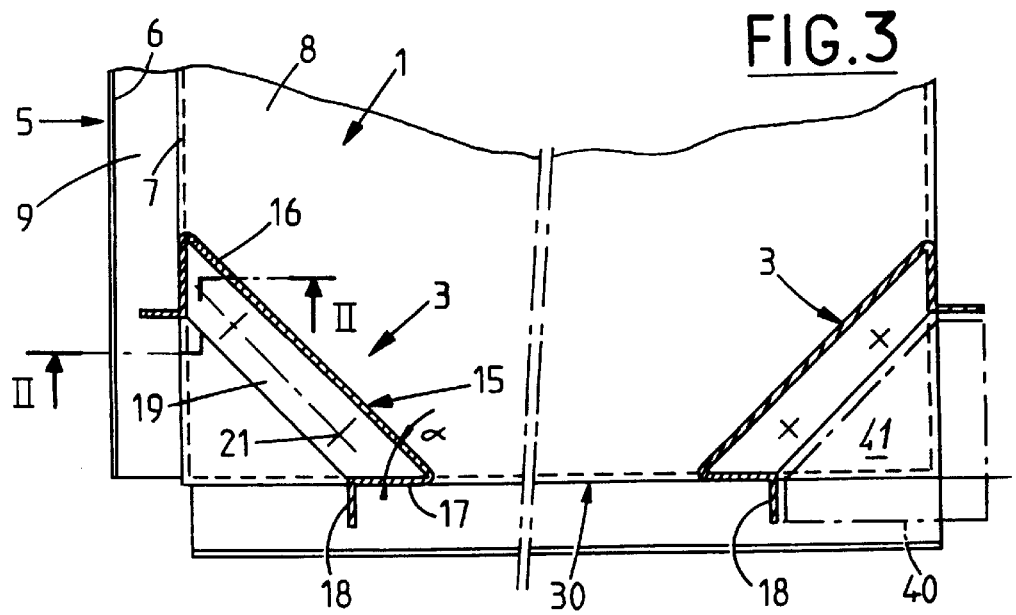

4,089,393

MODULAR STRUCTURE FOR CONSTITUTING AN ENCLOSURE

FIELD OF THE INVENTION

The present invention relates to the technical domain of the construction of enclosures from prefabricated constructive elements which may be assembled in situ to define one or more cells which may be used for various purposes.

The technical domain concerned is, more particularly, that of cells or enclosures intended to define an inner volume having to present a certain tightness with respect to the ambient medium, as well as an insulation of heat and/or sound nature.

Among the preferred applications, mention should be made of reaction, heating, baking enclosures, end, among the latter, more particularly, of bakers' ovens of modular character.

BACKGROUND OF THE INVENTION

In the above technical domain, numerous constructive propositions are known.

The different variants of construction from brick materials may be mentioned, which represent a first family of structures generally giving satisfaction for the function having to be performed.

However, these structures are generally constructed to occupy relatively large volumes and it is certainly one of the reasons which have led to the origin of a second constructive family.

By opposition to brick structures, this second family refers to structures from prefabricated constructive elements, generally based on metal, these prefabricated elements being assembled in dismountable manner to constitute the desired enclosure or cell.

This second constructive family aims more generally at enclosures of smaller volume intended to equip smaller premises in which only the ultimate phase of preparation or treatment prior, for example, to sale, is carried out, while the prior operational phases having to be imposed on the basic products are carried out in different premises.

Such is the case of the present baking installations which, in practice, are called in the profession "baking terminals".

The object of the invention essentially concerns the second constructive family.

The means employed for constructing in known manner an enclosure for example used as a baking oven, employ pre-fabricated elements which are essentially based on unitary panels which are to be assembled in situ. These panels are created to correspond to a type of cell arid, for this reason, prefabrication must be qualified as closed.

By such means, a reduction in the construction cost is certainly attained, but, up to the present time, a specific concept peculiar to each type of structure is proceeded with, without any possibility of modularity.

The constructions of enclosures or cells could therefore not enjoy any intrinsic evolution in dimensions nor any combination of cells, with the result that a relatively high individual cost was still associated therewith.

Furthermore, the erection of structures, enclosures or cells from such prefabricated panels involves a relatively heavy process of construction and requires qualified staff who must be experienced in a plurality of techniques, being given that the mechanical linkage of the prefabricated panels, the establishment of possible internal energy circuits and the efficient positioning of insulation means of heat and/or sound character, must be mastered.

In all, the construction of such an enclosure requires, with the known techniques, a relatively long time which increases the total price of the installation.

One object of the invention is to overcome the above drawbacks by proposing a modular structure for the constitution of an enclosure which may be rapidly erected in situ by staff who is certainly qualified but more particularly familiar with the techniques of assembly without having an absolutely wide knowledge of the adjacent technologies concerning the problems of tightness, the problems of heat insulation, the problems of sound insulation and/or the problems of implantation and installation of energy networks.

Another object of the invention is to propose a modular structure which, from basic elements offered in different sizes, may provide a possibility of producing an enclosure of modular character, able to define one or more juxtaposed and contiguous cells which are totally independent or intercommunicating.

SUMMARY OF THE INVENTION

In order to attain the above objects, the modular structure for constituting an enclosure from constructive elements including a floor, a ceiling, a plurality of pillars and a plurality of peripheral wall panels, which are organized to define at least one cell. The cell comprises a floor having a peripheral edge on which an upwardly open border is formed for interlocking;

a ceiling including a peripheral vertical flange;

a plurality of pillars which are disposed between the floor and the ceiling to form a framework therewith which defines a plurality of support frames which successively define a periphery of the framework;

a plurality of panels which are fitted in the border of the floor and are each removably fixed on a corresponding one of the support frames;

and a plurality of seals which are interposed between the constructive elements.

BRIEF DESCRIPTION OF THE DRAWINGS

The invention will be more readily understood on reading the following description with reference to the accompanying drawings, in which:

FIG. 2 is a partial section taken along plan II—II of FIG. 1 in correspondence with line II—II of FIG. 3.

FIG. 3 is a transverse section taken along line III—III of FIG. 2.

DESCRIPTION OF PREFERRED EMBODIMENT

Figure 1:
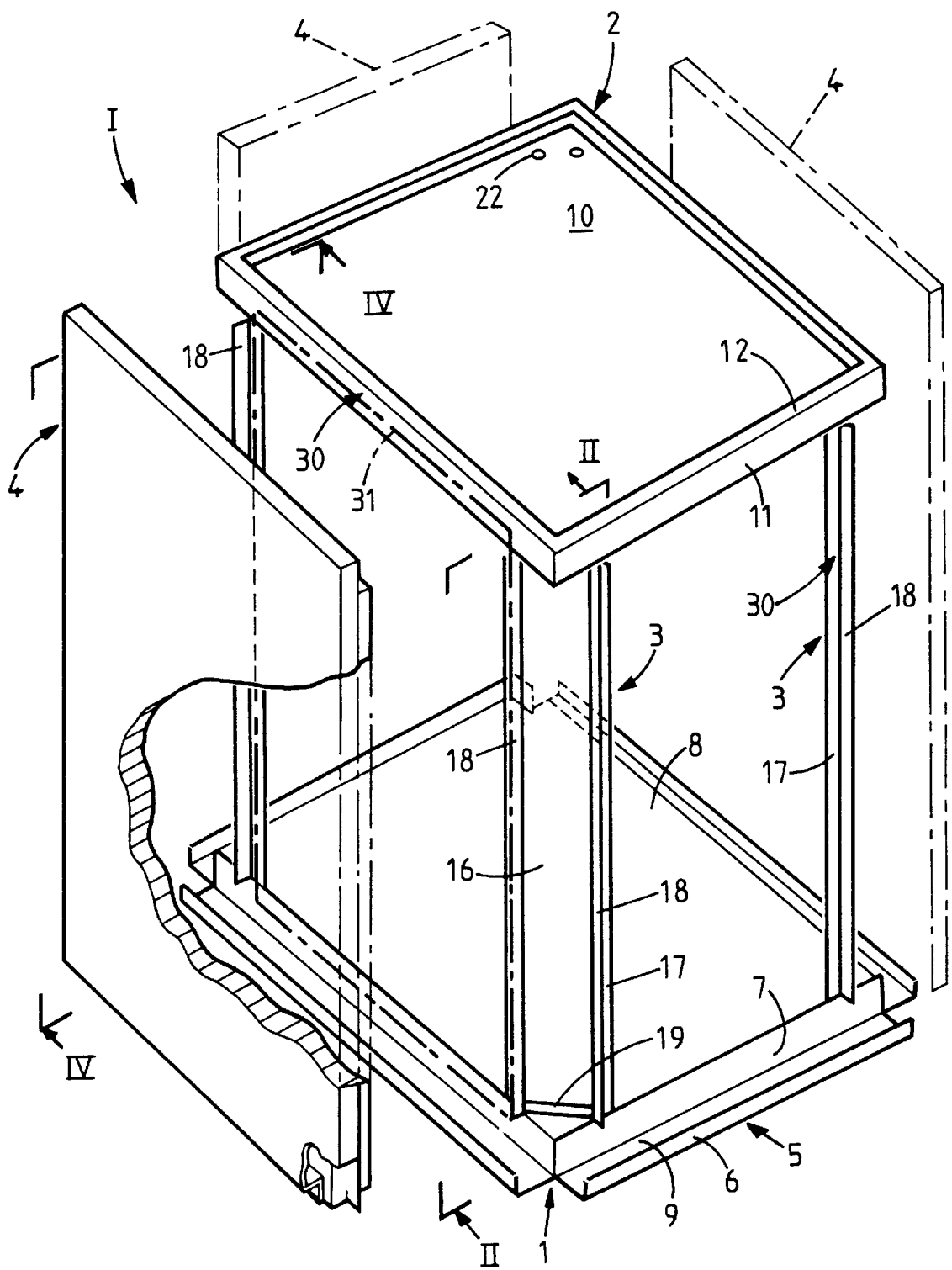
FIG. 1 is a perspective view with parts torn away, illustrating the constructive arrangement of the object of the invention.

Referring now to the drawings and firstly to FIG. 1, the modular structure according to the invention is shown in exploded view and with parts torn away in order to show more clearly the different constituent elements entering in the construction of such a structure. These different constituent elements employ a floor 1, a ceiling 2, pillars or posts 3 and peripheral wall panels 4.

In the example illustrated, the floor 1 and the ceiling 2 present a polygonal and more particularly rectangular shape in plan, but it must be considered that different shapes may be retained within the framework of the invention. For example, the structure might employ a floor 1 and a ceiling 2 of pentagonal, hexagonal, circular or even elliptic shape in plan as a function of the application envisaged.

The floor 1 and the ceiling 2 also preferably present an identical surface conformation in plan but it is also possible to employ different surfaces to the benefit of the floor or the ceiling.

The different constituent elements are intended to be assembled relatively, as will be seen hereinafter, so as to define an enclosure which, in the example illustrated in FIG. 1, is in the form of a single cell generally designated by reference I.

The floor 1 is made for example from a flat or formed metal sheet, bent so that its peripheral edge comprises an upwardly open border 5, preferably of U-section. The border may be continuous or, in the case of rectangular or polygonal plan, be limited to the different sides constituting the polygonal periphery, being interrupted in the angular parts, as illustrated in FIG. 1. The interlocking border 5, so-called for reasons which will be apparent hereinbelow, also preferably presents, as is visible in FIG. 2, an outer flange 6 which is of height less than the parallel flange 7 joining the border 5 to the floor 1 and more particularly to the bottom 8, flat or not, that this latter defines.

According to the invention, it is also judged preferable to produce the floor 1 so that the web 9 of the border lies in a plane lower with respect to the bottom 8.

The ceiling 2 is also advantageously made from a bent metal sheet to define a top 10 whose periphery is provided with an upwardly raised, continuous flange 11 preferably extended by a return angle 12 with a function of reinforcement.

The dimensional characteristics of the top 2 are chosen in the example illustrated so that the top 13 defined by the peripheral flange 11 corresponds in plan to the surface of the bottom 8 defined by the flanges 7 of the interlocking border 5.

Each pillar 3 is made, as illustrated in FIGS. 1, 2 and 3, by an open section 15 of a generally Ω-shaped cross-section. Such a section 15 is advantageously made by bending a metal sheet. Each section 15 comprises a web 16 bordered by two flanges 17 extending on one side of the web 16, making with the web 16 a variable angle α which is determined by the geometrical characteristic in plan of the floor 1 and of the ceiling 2 and of the location reserved for the pillars to link these two constructive elements. In the example illustrated, the pillars 3 are intended to be placed in the homologous angles of the floor 1 and the ceiling 2 disposed in superposed manner at a distance from each other and as a function of the rectangular shape in plan of the floor 1 and of the ceiling 2; the angle is chosen to be close to or equal to 45°.

The flanges 17 are each extended by a return angle flange 18 bent at right angles and preferably of the same width. Each pillar 3 is also completed by the existence of a foot 19 and a head 20, each constituted by a tab extending transversely at the end of the section to join the web 16 to the flanges 17.

The erection of the structure on the basis of the elements described hereinabove consists in placing on the floor 1, for example in abutment on a support or a ground S via the interlocking border 5, a pillar 3 recessed in each angle, so that the flanges 17 are aligned with the flanges 7 defining said angle. In such a position illustrated in FIG. 3, the return angle flanges 18 then extend outwardly in a direction at right angles to the edge of the floor defining the angle concerned.

Each pillar 3 is maintained in the required position via removable fixation members 21 which employ captive members 22 advantageously fixed permanently beneath the bottom 8 of the floor and complementary members 23 traversing appropriate holes made in the foot 19. A variable number of members 21 may be envisaged. Complementary members 23 are of the type capable of exerting pressure and tightening stress, so as to link the floor 1 and each pillar 3 with the interposition between the bottom 8 and the foot 19 of an O-ring 24. By way of example, appropriate members 22 and 23 are respectively constituted by nuts and by screws.

One proceeds in similar manner with the ceiling 2 which is placed in superposition to abut by its top 10 on the heads 20 of the different pillars 3. Linkage is effected via removable fixation members 21 of a type identical or equivalent to those positioned for connecting the feet 19 and the floor 1. As before, a flat O-ring 24 is interposed between each head 20 and the ceiling 2.

In the phase of erection, as has just been described, the constructive elements, connected together cis set forth hereinbefore, form a framework whose peripheral circumference is defined by a succession of frames 30 each constituted in correspondence with a side, according to the embodiment of FIG. 1, by the corresponding part of the edge 5, more particularly the flange 7, the corresponding part of the flange 11 and the two flanges 17 of two pillars. In the example illustrated, the framework consequently comprises four frames 30 which are separated from one another by re-entering angles defined by the pillars 3.

Each frame 30 is therefore defined vertically by the two return angle flanges 18 bordering the flanges 17, as is more clearly apparent in FIG. 3 and belonging to the two pillars which contribute to defining the frame 30. Each frame 30 consequently defines in the example illustrated a plane of abutment which is provided with a seal 31 constituted by a continuous flat joint which may be added in any appropriate manner, for example by adhesion.

Each panel 4 is preferably constituted by one or more metal sheets bent so as to constitute a caisson 35 occupied wholly or partly by a lining 36 of heat and/or sound insulating material. Each panel 34 is shaped so that, from its face intended to be placed in cooperation with a support frame 30, it comprises a base 37 capable of being fitted in the border 5, a flat face 38 capable of cooperating with the flange 7 of the border and the part of the flange 11 of the ceiling 2 and two edges 39 which are intended to cooperate by engagement with the return angle flanges 18 which constitute positioning guides for the latter.

Figure 4:
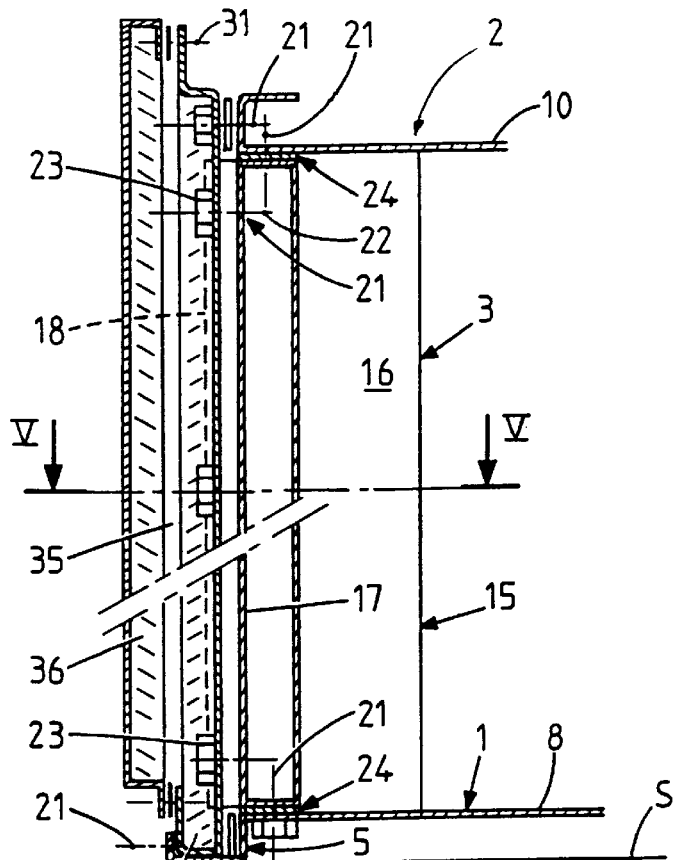
FIG. 4 is a partial section taken along plan IV—IV of FIG. 3 with correspondence of line IV—IV in FIG. 5.
Figure 5:
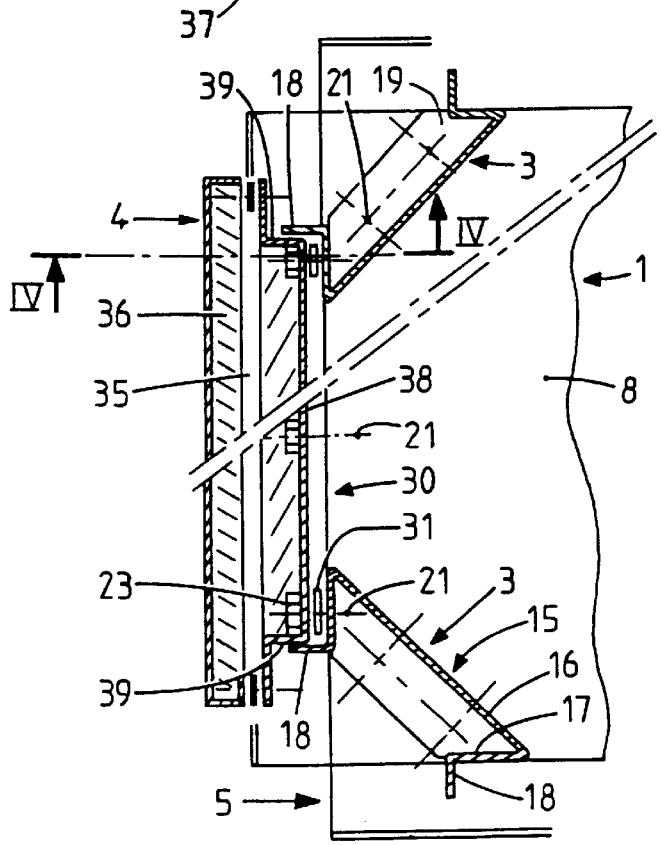
FIG. 5 is a transverse section taken along line V—V of FIG. 4.

The positioning of each panel 4 consists in fitting the base 37 in the border 5 or that part thereof corresponding to frame 30, then in pivoting the panel, for example in the direction of arrow $f_1$ of FIG. 4, towards the frame 30, so as to ensure correct positioning thereof by engagement of the edges 39 between the return angle flanges 18, as is apparent in FIG. 5. It must be understood that, in this situation, the return angle flanges 18 concerned belong to two corner pillars 3, as mentioned hereinbefore and as is seen in FIG. 5.

In this engagement by relative pivoting in the direction of arrow $f_1$, the face 38 is brought into abutment on the frame 30 with interposition of seal 31.

The panel 4 is maintained in position by removable fixation members 21 employing captive members 22 borne by the face 38 and complementary members 23 traversing the flanges 17, being engaged therethrough from the re-entering angle that each pillar 3 defines.

A complementary fixation by identical means 21 is effected between the base 37 and the flange 6 of the border 5.

One proceeds in identical manner for each of the sides of the framework so as to form the peripheral wall, as illustrated in dashed and dotted lines in FIG. 1. In the example illustrated and taking into account the conformation in plan of the floor 1 and the ceiling 2, four panels 4 are assembled, as mentioned hereinabove, to form the peripheral wall and define with the floor 1, the ceiling 2 and the pillars 3, a closed enclosure of single-cell type which may be rapidly erected from light structural means, while defining an internal volume insulated from the surrounding environment.

Although this has not been shown, it must be considered that at least one of the panels 4 is mace to comprise, in addition to the means described hereinabove, an opening giving access to the internal volume of the cell, such an opening being controlled via a pivoting panel arid in particular a door occupying all or part of the surface of the panel 4.

Similarly, it must be considered that at least certain of the panels 4 may be made to perform a specific function corresponding to the functioning peculiar to the enclosure and, in this respect, it may be envisaged to provide one or more of the panels with structural means capable of creating a circulation of air inside the cell, raising the temperature of a gaseous volume confined in this cell, or maintaining fixed and/or variable temperature and hygrometry conditions.

It follows from the foregoing that the structural means according to the invention make it possible to define, from light but resistant constructive elements, an enclosure suitably insulated from the surrounding environment by a process of simple and rigid assembly which may be carried out by staff entrusted solely with ensuring easy assembly of the constructive elements.

Another advantage of the object of the invention is to offer the possibility of employing a so-called open prefabrication. In fact, it is possible to manufacture, separately, ranges of pillars of different length and floors and ceilings of likewise different shape in plane and surface, and to choose from these ranges the constructive elements suitable for constructing or erecting a cell corresponding in volume and in shape exactly to the application envisaged.

It must be noted that the constructive elements include panels presenting per se the required character of insulation, such a character of insulation being applied to the floor or to the ceiling of which the conformation of the peripheral edge allows easy adaptation of a heat- or sound-insulating lining. Similarly, the particular form of the pillars as a re-entering angle makes it possible to house an insulating lining which thus contributes to perfecting the peripheral insulation of the cell.

Another advantage of the structure according to the invention lies in the fact that the mobile members 23 constituting the removable fixation means 21 are all accessible from the outer periphery of the enclosure, even when the peripheral wall has been constituted on the framework. This arrangement makes possible assembly or dismantling under all environmental conditions, without the staff being obliged to penetrate inside the useful volume of the enclosure. Such an advantage is particularly important in the event of the enclosure being intended to create and maintain a baking atmosphere at relatively high temperature, as it allows an intervention without awaiting a necessarily long cooling time.

It must be considered that it is possible to close the re-entering angles of the peripheral wall of the enclosure by providing the fit of gusset plates 40 of corner type, illustrated in dashed and dotted lines, fixed by any appropriate means on the return angle flanges 18 of the same pillar 3. By such a means, it may be provided to maintain these insulation lining in place and/or thus to define a sort of sheath 41 which may be reserved for the passage of lines, pipes or conduits for transferring or transporting energy.

Although this has not been shown, it might be envisaged to constitute the framework from means similar to those described hereinabove, pillars 3 being arranged to be placed substantially in the middle of each side of the floor 1 and the ceiling 2 without being recessed with respect to the angles thereof.

Similarly, the invention would also be applicable in the case of a floor and a ceiling presenting a shape in plan which is totally or partially curved, regularly or not.

Figure 6:
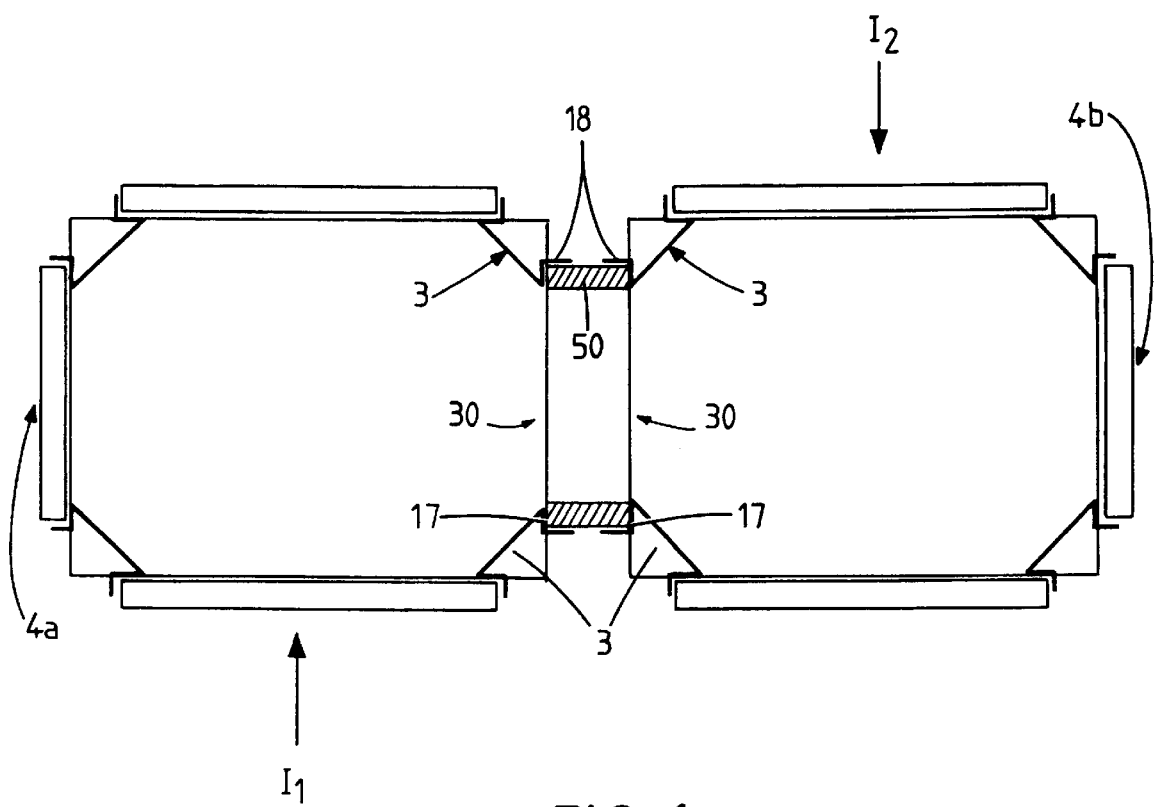
FIG. 6 is a plan view illustrating a variant of the object of the invention.

FIG. 6 illustrates a development wherein the modular structure employs the means described hereinabove to constitute two cells $I_1$ and $I_2$ which are disposed face to face via two support frames 30 bereft of panels 4.

The two cells are placed opposite and connected to each other via a belt 50 engaged between the return angle flanges 18 of two frames to abut, with the interposition of O-rings, on the opposite frames on which a firm and resistant connection is established by means of the removable fixation members 21 of the type as described hereinabove both for flanges 17 and for flange 11 of the ceiling 2.

As is clearly apparent in FIG. 6, the enclosure is then constituted by two cells which are intercommunicating and which may be rendered accessible via a so-called inlet panel $4_a$ and/or a so-called outlet panel $4_b$.

By such a means, it becomes possible to produce a multicell enclosure having its inherent character and constituting for example a chamber of tunnel nature.

FIG. 6 is given only by way of example, as a modular structure based on more than two cells may be envisaged, employing any appropriate relative mode of implantation.

The preferred industrial application of the invention is the erection and construction of baking ovens for bread products.

The invention is not limited to the examples described and shown, as various modifications may be made thereto without departing from its scope.

We claim:

1. A modular structure for forming an enclosure (I) from constructive elements, including a floor (1), a ceiling (2), a plurality of pillars (3) and a plurality of peripheral wall panels (4), which are organized to define at least one cell, the at least one comprising:

a floor (1) having a peripheral edge on which an upwardly open border (5) is formed for interlocking;

a ceiling (2) including a peripheral vertical flange (1);

a plurality of pillars (3) disposed between the floor (1) and the ceiling (2) to form a framework therewith which defines a plurality of support frames (30) which successfully define a periphery of the framework;

a plurality of panels (4) fitted in the upwardly open border (5) of the floor (1), each of the panels being removably fixed on a corresponding 1 of the support frames (30); and a plurality of seals interposed between the constructive elements.

2. A modular structure according to claim 1, wherein the floor (1) and the ceiling (2) each have a polygonal shape in plan.

3. A modular structure according to claim 1, wherein the pillars (3) are each formed by an open section (25) having a generally Omega-shaped cross-section, the Omega-shaped cross-section including a web (16), two flanges (17) which extend away from the web (16) on one side of the web (16), and two return angle flanges (18) each of which extends a respective one of the two flanges (17), the return angle flanges (18) being substantially at right angles to the respective flange (17).

4. A modular structure according to claim 3, wherein the floor (1) and the ceiling (2) are placed in superposition to define a plurality of homologous angles;

wherein each of the pillars (3) is recessed in a respective one of the homologous angles of the floor (1) and the ceiling (2); and wherein the flanges (17) are aligned with an internal edge of the upwardly open border (5) and an edge of the ceiling (2) and the return angle flanges (18) extend outside of the support frames (30).

5. A modular structure according to claim 4, wherein each of the pillars (3) comprises:

a foot 19 which is connected with the floor (1);

a head (20) which is connected with the ceiling (2), the foot (19) and the heed (20) each being formed by a tab extending between the web (16) and the two flanges (17).

6. A modular structure according to claim 4, wherein the framework defines a number of support frames (30) corresponding to the number of panels (4); and wherein each panel (4) has a face (38) oriented towards the corresponding support frame (30) on which two edges are formed for engagement between the respective return angle flanges (18) which form vertical guides for positioning the corresponding panel (4).

7. A modular structure according to claim 1, further comprising:

a flat peripheral seal (31) associated with each support frame (30) for sealing each support frame with a corresponding panel (4).

8. A modular structure according to claim 1, wherein the constructive elements are connected together by removable fixation members, the fixation members being accessible from outside the at least one cell.

9. A modular structure according to claim 8, wherein the fixation members comprise:

a plurality of captive members (22) which are fixed on the floor (1) and the ceiling (2) for connection with the root (19) and the head (20), respectively, of each pillar (3) and on each panel (4) for connection with the corresponding support frame (30); and a plurality of complementary members (23) which traverse the foot (19), the head (20), the two flanges (17) of each pillar (3), the border (5) of the floor (1) and The peripheral flange (1) of the ceiling.

10. A modular structure according to claim 1, wherein at least certain panels (4) are in the form of a caisson containing a lining of insulating material (36).

11. A modular structure according to claim 1, wherein the constructive elements are organized to define two cells which are contiguous and oppose each other with one of the support frames (30), the cells being joined together by a belt (50) which is positioned between the return angle flanges (18) of the opposing support frames (30), is fitted in the border (5) of the floors (1), and is fixed to the opposing support frames (30) with the interposition of the O-rings.

12. A modular structure according to claim 1, wherein at least certain pillars (3) are associated with a gusset plate (40) disposed between the two flanges (17) to define a sheath (41) which protects equipment.

13. A modular structure according to claim 1, wherein at least certain pillars (3) are associated with a gusset plate (40) disposed between the two flanges (17) to define a sheath (41) which maintains an insulated lining.

14. A modular structure according to claim 1, wherein at least one of the panels (4) defines a door.

15. A modular structure according to claim 1, wherein at least one of the panels (4) supports a door.

16. A modular structure according to claim 1, wherein at least one of the panels (4) is provided with a functional unit.

* * * * *